Patented Dec. 30, 1947

2,433,601

UNITED STATES PATENT OFFICE 2,433,601

PREPARATION OF PURIFIED BRINE

Rock L. Comstock, Weeks, La., assignor to Bay Chemical Company, Inc., New Orleans, La., a corporation of Louisiana No Drawing. Application January 25, 1944, Serial No. 519,651

10 Claims. (Cl. 23—89)

This invention relates to the preparation of purified brine and more particularly to the preparation of sodium chloride brine low in calcium and sulfate radicals from crude sodium chloride or rock salt containing substantial quantities of calcium sulfate.

For certain purposes, such as for regeneration of zeolites for water softeners, the production of chlorine by electrolysis, and in many dye processes, it is extremely desirable if not necessary to reduce the concentration of calcium radical and also the sulfate radical in brine to extremely low values. In conventional processes of making such pure brines it has been the practice to form a brine by dissolving crude salt in water and then add certain reagents to the brine, in order to precipitate the undesired compounds. For example, calcium has been precipitated as calcium carbonate by adding an alkali metal carbonate such as sodium carbonate, magnesium has been precipitated by adding alkali metal hydroxides, and the sulfate radical has been precipitated as barium sulfate by adding a soluble barium salt. These operations result in the formation of bulky precipitates which must be filtered or settled out of the resulting brine. The precipitation of the sulfate radical is particularly difficult in that it usually involves a separate and expensive step and the presence of the sulfate radical is frequently tolerated rather than its removal undertaken.

In accordance with the present invention it has been found that brines low in sulfate radical as well as calcium radical may be prepared by employing as inhibiting agents small amounts of soluble compounds such as alkali metal carbonates or phosphates which form insoluble compounds with calcium radical. That is to say, the agents employed will react with calcium sulfate in aqueous solution to precipitate a water-insoluble calcium compound. Not only is the amount of agent required to produce a brine low in calcium radical reduced over that of prior processes but the same agent reduces the amount of sulfate radical, contrary to what would be expected from said prior processes.

It is, therefore, an object of the present invention to provide an improved process of obtaining brines low in calcium compounds from crude sodium chloride containing substantial amounts of such calcium compounds.

An object of this invention is to provide a method of inhibiting the solution of calcium sulfate impurity in salt by dissolving the salt in the presence of precipitant of calcium radical, the dissolving preferably being conducted at a pH of 7 or more.

Another object of the invention is to provide an improved method of producing sodium chloride brine low in sulfate content from crude sodium chloride having a substantial calcium sulfate content.

Another object of the invention is to provide an improved process of obtaining a purified sodium chloride brine from crude sodium chloride in which soluble agents which form insoluble calcium compounds with calcium sulfate are employed to inhibit solution of calcium sulfate contained in the crude sodium chloride.

Another object of the invention is to provide a process of making a purified brine in which the quantity of agents required to produce a brine substantially free of calcium and sulfate radicals is markedly reduced.

A further object of the invention is to provide an improved process of obtaining sodium chloride brine substantially free of sulfate radical and calcium radical from crude sodium chloride having a substantial calcium sulfate content in which the solution of the sodium chloride is carried out in the presence of alkali metal compounds forming insoluble compounds with calcium sulfate.

A still further object of the invention is to provide an improved solid salt product containing a solution inhibiting agent for calcium sulfate contained in said salt.

In carrying out the process of the present invention, the brine is formed in the first instance by dissolving a salt in the presence of the agents which react with calcium radical to produce insoluble compounds. This is preferably accomplished by dissolving sodium chloride from crude salt or rock salt in the presence of such agents, although the invention is applicable to the preparation of brines from salts other than sodium chloride. It has been found, for example, that the sulfate content of brines produced by dissolving such salt containing substantial amounts of calcium sulfate, in the presence of small amounts of sodium carbonate or trisodium phosphate results in a much lower sulfate content than that obtained if the same amount of sodium carbonate or phosphate is added to the brine after formation thereof and the resulting insoluble precipitates removed from the brine. Adding the agents of the present invention to the brine after formation thereof has little effect upon reduction of the total amount of sulfate radical, whereas operations in accordance with the present invention definitely inhibit solution of sulfate radical.

The soluble agent employed in the present invention is preferably dissolved in the water prior to dissolving the rock salt or other impure sodium chloride containing sulfate and calcium radicals, but may be added to and mixed with the impure sodium chloride prior to the dissolving operation. Best results are, however, obtained by first dissolving the agent in the water used to dissolve the impure sodium chloride.

It has also been found that the pH of the water during the dissolving operation is of importance. The content of calcium compounds including calcium sulfate, in the brine increases rapidly as the pH of the water drops below 7. Thus, the addition of an alkaline material such as sodium hydroxide to water having a low pH value to bring its pH up to at least 7 prior to dissolving the crude salt materially reduces the content of calcium radical and sulfate radical in the resulting brine but further additions of sodium hydroxide have very little further effect. For example, the amount of calcium sulfate present in the brine when employing a distilled water having a pH of 5.2 is approximately three times that when a water having a pH of 7 is employed. The pH of water can be raised with alkaline compounds other than hydroxides or a natural water having a pH of 7 or above can be employed to give a similar reduction in calcium sulfate in the final brine. The employment of alkaline compounds such as basic alkali metal carbonates or phosphates which react with calcium radical to form insoluble compounds is, however, preferred for increasing the pH of a water which has a pH below 7 as such compounds also have the additional effect discussed above of further decreasing the amounts of calcium radical and calcium sulfate in the resulting brine. Addition of these materials to a water which already has a pH above 7 also produces the additional effect above referred to. For example, by employing an alkali metal carbonate or alkali metal phosphate the amount of sulfate radical in the final brine can be reduced to approximately one-fourth or one-fifth that produced when hydroxides alone are employed. If the particular carbonates or phosphates or other compounds selected do not increase the pH to 7 or greater, a strong alkali such as an alkali metal hydroxide can be employed in conjunction therewith to increase the pH.

The precipitating agent may be added to either the crude salt or to the water employed to dissolve the crude salt. The preferred method is to add the agent to the water employed for the dissolving operation as this results in a more uniform application of the agent to the crude salt. However, a small amount of powdered agent or a concentrated solution of the agent may be thoroughly admixed with crushed rock salt or other comminuted salt prior to contacting it with water for dissolving the salt. In any event the dissolving operation is carried out in the presence of the agent.

The following table shows typical results illustrating the difference obtained (1) without an inhibiting agent, (2) adding an inhibiting agent to the brine after dissolving the salt, and (3), (4) dissolving the salt in the presence of an inhibiting agent, the particular agent selected being sodium carbonate.

*Table I*

| | Agent | | | Resulting Brine | | |
|---|---|---|---|---|---|---|
| Type | Pounds per gallon of water | Parts per 100 parts of NaCl dissolved | When added | Parts CaSO$_4$ dissolved per 100 parts NaCl dissolved | Per Cent Efficiency | Residual CaO in parts per 100 parts of salt dissolved |
| 1. None | 0 | 0 | | 0.167 | | 0.069 |
| 2. Sodium Carbonate | 0.0028 | 0.1 | To brine after dissolving salt | 0.138 | 17 | 0.024 |
| 3. Sodium Carbonate | 0.0028 | 0.1 | To salt before adding water | 0.042 | 75 | 0.011 |
| 4. Sodium Carbonate | 0.0028 | 0.1 | To water before adding salt | 0.036 | 78 | 0.012 |

In securing the data for the above table the impure salt containing calcium sulfate was added to water in an amount equal to one part salt to three parts water and the mixture agitated for 15 minutes so as to dissolve substantially all the salt and the resulting brine then filtered. Any further precipitate forming after filtering was settled and removed. The sulfate content of the filtered brine is reported as calcium sulfate and the calcium content as calcium oxide. It will be noted that addition of the agent to the brine after dissolving the salt as in run 2 did not have much effect on reduction of sulfate content but did materially reduce the calcium content. However, adding the agent to either the salt or the water prior to the dissolving operation not only further reduced the calcium content but very markedly reduced the sulfate content. Addition of the agent to the water gave somewhat better results than adding the agent to the salt as shown by a comparison of runs 3 and 4.

The following table illustrates typical results obtained on the same impure salt without employing an inhibiting agent and by employing the same amounts of sodium carbonate and trisodium phosphate. Anhydrous sodium carbonate (Na$_2$CO$_3$) and hydrated trisodium phosphate (Na$_3$PO$_4$.12H$_2$O) were used throughout experiments and all weights and ratios refer to these forms. Other forms containing equivalent amounts of inhibiting agent may be used.

*Table II*

| | Agent | | | Resulting Brine | | |
|---|---|---|---|---|---|---|
| Type | Pounds per gallon of water | Parts per 100 parts of NaCl dissolved | When added | Parts CaSO$_4$ dissolved per 100 parts NaCl dissolved | Per Cent Efficiency | Residual CaO in parts per 100 parts of salt dissolved |
| | 0 | 0 | | .285 | | 0.122 |
| Sodium Carbonate | .00556 | .200 | To water before adding salt | .055 | 81 | 0.0021 |
| Trisodium Phosphate | .00556 | .200 | do | .030 | 88 | 0.0020 |

It will be noted that both of these agents decreased the calcium content by about the same amount while the trisodium phosphate was somewhat more effective as to inhibiting solution of sulfate radical, the percent efficiency of the trisodium phosphate being 88 while that of the sodium carbonate being 81. In general, the trisodium phosphate is more effective for this purpose as shown by the following table which also illustrates the effect on sulfate content of varying the amount of agent.

*Table III*

| Agent | | | | Resulting Brine | |
|---|---|---|---|---|---|
| Type | Pounds per gallon of water | Parts per 100 parts of NaCl dissolved | When added | Parts CaSO₄ dissolved per 100 parts NaCl dissolved | Per Cent Efficiency |
| Sodium Carbonate | .00092 | .033 | To water before adding salt | .066 | 77 |
|  | .00185 | .067 | ___do___ | .054 | 81 |
|  | .00277 | .100 | ___do___ | .057 | 80 |
|  | .00370 | .133 | ___do___ | .041 | 86 |
|  | .00463 | .167 | ___do___ | .052 | 82 |
|  | .00556 | .200 | ___do___ | .066 | 77 |
| Trisodium Phosphate | .00092 | .033 | ___do___ | .064 | 78 |
|  | .00185 | .067 | ___do___ | .038 | 87 |
|  | .00277 | .100 | ___do___ | .033 | 88 |
|  | .00370 | .133 | ___do___ | .032 | 89 |
|  | .00463 | .167 | ___do___ | .030 | 90 |
|  | .00556 | .200 | ___do___ | .027 | 91 |

The salt used in the tests shown in Tables I, II and III was of mine run grade, having 1.31% calcium sulfate and the following screen analysis: on 2 mesh—21.7%; on 4 mesh—54.2%; on 9 mesh—18.9%; on 20 mesh—3.2%; thru 20 mesh—2.0%.

When the data of the above table are plotted as a curve it is found that with sodium carbonate the amount of sulfate reaches a minimum at approximately 0.12% sodium carbonate based on the amount of salt dissolved or 0.00344 pound per gallon of water employed and that the amount of sulfate decreases to a nearly constant value at approximately the same figure when employing trisodium phosphate. These amounts will vary somewhat with different salts being dissolved and different agents but good results will usually be obtained between approximately 0.0014 to 0.0057 lb. of inhibiting agent per gallon of water employed or between approximately 0.051 and 0.21% of agent based on the amount of salt dissolved, when, as is usually the case, approximately 1 part of salt by weight is dissolved in 3 parts of water. Best results are obtained by employing between approximately 0.0028 to 0.0034 lb. of agent per gallon of water or 0.10 to 0.12% of agent based on the amount of salt dissolved. For trisodium phosphate the smaller amounts given in the preceding sentence are preferred while the larger amounts are preferred for sodium carbonate. It is found that a slight excess of the agent should be present in the resultant brine for best results which test is applicable to operations on impure salts having widely varying sulfate and alkaline earth metal content although the ranges above given are generally applicable. Thus, an excess of agent residual in the brine ranging between approximately 0.001 to 0.0017 pound per gallon of water over that consumed in precipitating calcium radical dissolved from the salt gives best results. In general, the amount of agent necessary to produce such an excess will not exceed 0.25% of the salt dissolved.

In Tables II and III distilled water was used to eliminate any effect of alkali metal or calcium compounds which might be present in natural water. However, natural waters, even hard waters, can be employed to produce substantially the same results, particularly if enough precipitating agent is employed to provide the excess above mentioned over the total amount of calcium radical in both the water and dissolved from the salt. Also, less alkaline agents, such as sodium bicarbonate or disodium phosphate, can be employed to give substantially similar results if a strong alkali such as an alkali metal hydroxide is added in sufficient amounts to bring the pH of the water to 7 or above. Also, mixtures of various agents either of the same alkalinity or of different alkalinity can be utilized so long as the resulting pH is at least 7.

To illustrate the results of dissolving salts of different degrees of division and having different sulfate contents, the following tables are given.

*Table IV*

| Type of Salt | Per cent CaSO₄ in salt | Parts CaSO₄ dissolved per 100 parts salt dissolved | | Per cent Efficiency |
|---|---|---|---|---|
| | | Water alone | Water plus agent | |
| Dust | 2.42 | .440 | .126 | 71.5 |
| Table | 1.27 | .230 | .018 | 92.2 |
| Preferred | 1.04 | .229 | .019 | 91.8 |
| C | 1.10 | .217 | .021 | 90.5 |
| #1 | 1.58 | .244 | .023 | 90.7 |

*Table V*

| Screen Sizes | Per Cent On 4 | Per Cent On 9 | Per Cent On 20 | Per Cent On 40 | Per Cent On 60 | Per Cent On 80 | Per Cent On 100 | Per Cent Through Screen |
|---|---|---|---|---|---|---|---|---|
| Dust | 0 | 0 | 0 | 0.9 | 6.8 | 11.6 | 26.5 | 54.2-100 |
| Table | 0 | 0 | 0 | 47.2 | 41.6 | 4.4 | | 6.7-80 |
| Preferred | 0 | 0 | 1.9 | 89.8 | 3.5 | .3 | | .6-80 |
| C | 0 | 0 | 91.2 | 4.5 | 1.2 | .5 | | 2.6-80 |
| #1 | 81.2 | 18.5 | | | | | | .3-9 |

Table IV shows the amount of calcium sulfate dissolved when an inhibiting agent was employed as compared to the amount when water alone was employed whereas Table V shows the particle sizes of the salt dissolved. The inhibiting agent in all of the examples of Table IV was .00556 pound of trisodium phosphate per gallon of water or .2% based on the amount of salt dissolved. It will be noted that the per cent efficiency of inhibiting the solution of sulfate is apparently affected more by the size of the salt particles than by the amount of calcium sulfate in the salt. Thus, the salts having the greatest amount of fines gave the poorest per cent efficiency and this indicates that the inhibiting action may be a surface coating phenomenon since the effect appears to depend upon the surface area of the particle. The same thing can be shown by taking two samples of a rather coarse salt, dissolving one without grinding and grinding the other before dissolving. Thus, using the same agent, namely .00277 lb. of trisodium phosphate per gallon of water or 0.1% of the salt dissolved, a coarse sample of salt having particle sizes such that 81.2% was retained on a No. 4 screen, 18.5% on a No. 9 screen, with 0.3% going through, gave a sulfate solution inhibiting efficiency of 88.5%, whereas a ground sample of the same salt having particle sizes such that none was retained on a No. 26 screen, 35.8% on a No. 40 screen, and 42% on a No. 100 screen, with 22.2% going through, gave a sulfate solution inhibiting efficiency of only 78%. These figures indicate that better results are obtained with coarser salts.

It is apparently the presence of the phosphate, carbonate or similar radical during dissolving of the sodium chloride from the crude salt in conjunction with the pH of the water employed being above 7, which inhibits the dissolving of calcium sulfate and other calcium compounds. It will, therefore, be further apparent that other carbonates such as bicarbonate or other phosphates such as disodium or monosodium phosphates can be employed and if necessary alkali metal hydroxides or other strong alkali can be employed in conjunction therewith to insure that the pH of the water during extraction of the crude salt is at least as high as 7 and preferably in the neighborhood of 8 or greater. As stated above, a major reduction of calcium sulfate as well as other calcium compounds in the resulting brine can be obtained by increasing the pH of waters having a pH below 7 by the addition of substantially any alkaline material. However, increasing the pH above 7 with such an alkali as sodium hydroxide has very little effect whereas the addition of alkali metal compounds which form insoluble compounds with calcium compounds provides a further decrease of calcium sulfate and other calcium compounds in the resulting brine. Thus, the alkali metal carbonates and phosphates are particularly useful, the latter giving better results than sodium carbonate.

The step of dissolving the sodium chloride containing calcium sulfate so as to inhibit the dissolving of the calcium sulfate as well as any other calcium compounds which may be present may be carried out in substantially any desired manner so long as the inhibiting agent is present during the dissolving operation. Thus water containing the inhibiting agent may be added to a body of salt or conversely the crude salt can be added to a body of water and the dissolving operation may be carried out with or without agitation. Alternatively the inhibiting agent can be added to the impure salt either in powder form or as a concentrated solution and the dissolving operation carried out as above described. The impure solid salt containing the inhibiting agent can be made and sold as a product of commerce so that purchasers may make the purified brine of the present invention by merely adding water and then filtering or settling.

While I have disclosed the preferred embodiments of my invention it is understood that the details thereof may be varied within the scope of the following claims:

I claim:

1. In a method of preparing brine in which the materials brought into contact to form said brine are water and a solid water-soluble salt containing a substantial amount of water-soluble calcium sulfate as an impurity, the improvement which comprises forming a brine low in sulfate radical and calcium radical by adding to one of said materials before bringing said materials into contact a small amount of water-soluble alkali metal compound selected from the group consisting of alkali metal carbonate and alkali metal phosphate and which reacts with calcium sulfate in aqueous solution to precipitate a water-insoluble calcium compound, thereafter bringing said materials into contact to dissolve salt in said water and separating residual solid material from the resulting brine.

2. The method defined in claim 1, in which the amount of water-soluble alkali metal compound added to one of said materials is between approximately 0.051 and 0.25% by weight based on the salt dissolved in said water.

3. The method defined in claim 1, in which the amount of water-soluble alkali metal compound added to one of said materials is between approximately 0.0014 and 0.0057 pound per gallon of water used to dissolve said salt.

4. The method defined in claim 1, in which the water used to dissolve said salt has a pH of at least 7.

5. In a method of preparing brine in which the materials brought into contact to form said brine are water and solid sodium chloride containing a substantial amount of water-soluble calcium sulfate as an impurity, the improvement which comprises forming a brine low in sulfate radical and calcium radical by adding to one of said materials before bringing said materials into contact a small amount of water-soluble alkali metal compound selected from the group consisting of alkali metal carbonate and alkali metal phosphate and which reacts with calcium sulfate in aqueous solution to precipitate a water-insoluble calcium compound, thereafter bringing said materials into contact to dissolve sodium chloride in said water and separating residual solid material from the resulting brine.

6. In a method of preparing brine in which the materials brought into contact to form said brine are water and solid sodium chloride containing a substantial amount of water-soluble calcium sulfate as an impurity, the improvement which comprises forming a brine low in sulfate radical and calcium radical by adding to one of said materials before bringing said materials into contact an amount between approximately 0.051 and 0.25% by weight based on the sodium chloride dissolved in said water of water-soluble alkali metal salt selected from the group consisting of alkali metal carbonate and alkali metal phosphate and which reacts with calcium sulfate in aqueous solution to precipitate a water-insoluble calcium compound, thereafter bringing said materials into contact to dissolve sodium chloride in said water and separating residual solid material from the resulting brine.

7. The method defined in claim 6, in which the water-soluble alkali metal salt added to one of said materials is an alkali metal carbonate.

8. The method defined in claim 6, in which the water-soluble alkali metal salt added to one of said materials is sodium carbonate.

9. The method defined in claim 6, in which the water-soluble alkali metal salt added to one of said materials is trisodium phosphate.

10. The method defined in claim 6, in which the water used to dissolve said solid sodium chloride has a pH of at least 7.

ROCK L. COMSTOCK.

REFERENCES CITED

The following references are of record in the file of this patent:

UNITED STATES PATENTS

| Number | Name | Date |
|---|---|---|
| Re. 1,290 | Spencer | Mar. 18, 1862 |
| 41,980 | Duffield | Mar. 22, 1864 |
| 436,633 | Monsanto | Sept. 6, 1890 |
| 773,343 | Sachse | Oct. 25, 1904 |
| 902,403 | Holloway | Oct. 27, 1908 |
| 1,308,509 | Riiber | July 1, 1919 |
| 1,475,563 | Brooks | Nov. 27, 1923 |
| 2,108,783 | Smith | Feb. 15, 1938 |
| 2,191,411 | Pierce | Feb. 20, 1940 |

FOREIGN PATENTS

| Number | Country | Date |
|---|---|---|
| 25,082 | Great Britain | 1909 |